3,297,757
ALKYL ARALKYL HYDRAZONIUM SALTS
James M. Sprague, Gwynedd Valley, and Edward J. Cragoe, Jr., Lansdale, Pa., assignors to Merck & Co., Inc., Rahway, N.J., a corporation of New Jersey
No Drawing. Filed Jan. 3, 1961, Ser. No. 79,952
17 Claims. (Cl. 260—569)

This invention relates to new anti-hypertensive agents. More specifically, this invention relates to new compounds of the formula:

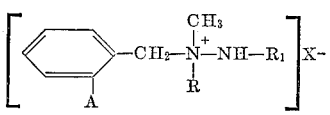

in which A may be halogen, lower alkyl, nitro or trifluoromethyl, R is lower alkyl, $R_1$ may be hydrogen or lower alkyl and $X^-$ is an anion.

Hypertension is increasingly becoming a medical problem in humans as the complexities of civilazation increase. There is, consequently, a need for better medical control of hypertension by the use of anti-hypertensive agents.

We have found a new and very potent class of anti-hypertensive agents, represented by the class of compounds described above. The compounds of our invention have extraordinarily high potency as anti-hypertensive agents and have the further advantage that they lack the muscarinic effects so common in other anti-hypertensive agents.

The compounds of our invention are quaternary hydrazonium salts. They are prepared by the reaction of the proper hydrazine with the proper quaternizing agent to form the quaternary salt. Since the same end product is obtained no matter which hydrazine and which quaternizing agent is used, the selection of intermediates is governed primarily by the ease of preparation of the desired hydrazine. Some of the desired hydrazines, such as 1,1-dimethylhydrazine, are already known and the others can be prepared from secondary amines of the general structure by reaction with

hydroxylamine-O-sulfonic acid to form the desired hydrazine or

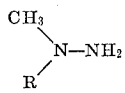

the secondary amines can be nitrosated with nitrous acid and the intermediate nitroso-amine reduced to form the hydrazine. The secondary amine may be dimethylamine, methylethylamine, methylpropylamine or the like. The hydrazine thus produced is quaternized with the desired benzyl halide.

An alternative synthesis of the compounds of our invention is the condensation of the selected benzyl halide with methylamine to form a secondary amine of the formula

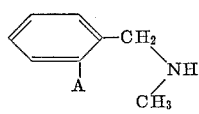

The hydrazine is then synthesized by the similar methods as described above, i.e., using hydroxylamine-O-sulfonic acid. Alternatively, the hydrazine can be synthesized by direct reaction of the benzyl halide with a large excess of an alkylhydrazine. The hydrazine is then quaternized, using an alkyl halide as the quaternizing agent. Such quaternizing agents include methyl iodide, ethyl bromide or iodide, propyl iodide, and the like. Since at least one of the groups must be methyl, either the alkylhydrazine or the alkyl halide quaternizing agent or both must have methyl as its alkyl group.

The benzyl halides which may be used in the above syntheses, either as a quaternizing agent or in forming the hydrazine, must have an o-substituent in order to be active. These o-substituents are halogens, lower alkyls, nitro or trifluoromethyl. Thus, one may use o-bromobenzyl bromide, o-bromobenzyl chloride, o-iodobenzyl chloride, o-fluorobenzyl chloride, o-methylbenzyl bromide, o-ethylbenzyl bromide, o-nitrobenzyl chloride, o-trifluoromethylbenzyl bromide and the like.

The quaternization reaction is usually run in the absence of a solvent. Solvents such as benzene, toluene, alcohols and the like can be used but in many cases it is preferable to use on of the reactants as a vehicle. This is especially true when the quaternizing agent is a benzyl halide which can be used in a slight excess. The temperature of the reaction is kept below 65°. The reaction proceeds at room temperature but is slow at such low temperatures. On the other hand, decomposition and side reactions become more significant problems as the reaction temperature is raised and the reaction time is extended. It should be noted that these quaternary salts are sensitive to heat. In practice, the hydrazine is mixed with a slight excess of the benzyl bromide and the mixture is heated to 50° for a very short time. Upon cooling, the reaction mixture solidifies and the product is isolated by dissolving in a solvent such as an alcohol, followed by precipitation with another solvent such as ether. Alternatively, excess reagents can be extracted from the solid reaction mixture by trituration with a solvent, leaving the desired salt undissolved. The product may be recrystallized by dissolving in one solvent and slowly precipitating with another, avoiding as much as possible, the use of heat.

The anion of these hydrazonium salts may be any of a number of anions. Normally, one obtains a halide from the quaternization reaction, although quaternization with methyl sulfate or a tosylate will produce the methosulfate or tosylate anion. By passing an aqueous solution of the hydrazonium salt through the proper ion exchange resin, in the base form one can obtain a solution of the hydrazonium hydroxide and such a solution can be titrated with any desired acid such as mineral acid (sulfuric acid, nitric acid, and the like), organic acid (acetic acid, propionic acid and the like) or sulfonic acids (methanesulfonic acid, benzenesulfonic acid and the like).

The compounds of our invention can be administered either parenterally or orally. They may be mixed with pharmaceutically accepted carriers to form solutions, syrups, pills, capsules, tablets and the like. Orally, they may be administered in solution or in unit dosages in the form of tablets, or capsules. The dosage range is from 1–15 mg. per kg., parenterally and from 20–450 mg. per kg. orally.

Our invention can be illustrated by the following examples:

*Example 1*

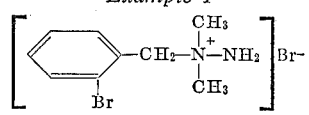

1,1-dimethylhydrazine (12.27 g.) is dissolved in 250 ml. of isopropyl alcohol and heated to boiling under anhydrous conditions. To this is then added, dropwise, 56.25 g. of o-bromobenzyl bromide. The reaction mixture is then heated under reflux for five minutes. The solution is then cooled. The mixture solidifies. The product, 1 - (o - bromobenzyl) - 1,1 - dimethylhydrazonium bromide, is recrystallized from tertiary butyl alcohol. M.P. 140–141° C.

*Analysis.*—Calculated for $C_9H_{14}Br_2N_2$: C, 34.86; H, 4.55; Br, 51.55; N, 9.04. Found: C, 34.95; H, 4.59; Br, 51.67; N, 8.86.

*Example 2*

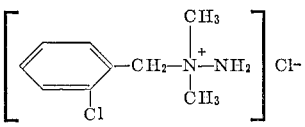

A solution of 4.09 g. of 1,1-dimethylhydrazine in 30 ml. of isopropyl alcohol is agitated while 12.08 g. of o-chlorobenzyl chloride is added drop-wise. The solution becomes warm, as an exothermic reaction is observed. It is then heated to reflux under anhydrous conditions for five minutes. The solution is then cooled and 10 ml. of anhydrous ether is added until precipitation starts. The reaction mixture is then chilled in a refrigerator and the solid 1-(o-chlorobenzyl)-1,1-dimethylhydrazonium chloride, is recrystallized from absolute ethanol and anhydrous ether. M.P. 175.5–176.5° C.

*Analysis.*—Calculated for $C_9H_{14}Cl_2N_2$: C, 48.88; H, 61.38; N, 12.67. Found: C, 48.86; H, 6.18; N, 12.50.

When equivalent quantities of o-iodobenzyl bromide or o-fluorobenzyl chloride are used in the above procedure in place of the o-chlorobenzyl chloride, the corresponding 1-(o-iodo or o-fluorobenzyl)-1,1-dimethylhydrazonium bromide or chloride are obtained.

*Example 3*

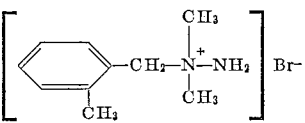

The procedure of Example 1 is followed using an equivalent quantity of o-methylbenzyl bromide in place of o-bromobenzyl bromide to yield 1-(o-methylbenzyl)-1,1-dimethylhydrazonium bromide. After three recrystallizations from methanol and anhydrous ether the M.P. was 180–180.5° C.

*Analysis.*—Calculated for $C_{10}H_{17}BrN_2$: C, 48.99; H, 6.99; N, 11.43. Found: C, 48.83; H, 6.94; N, 11.40.

When o-ethylbenzyl bromide is used in place of the o-methylbenzyl bromide, the corresponding 1-(o-ethylbenzyl)-1,1-dimethylhydrazonium bromide is obtained.

*Example 4*

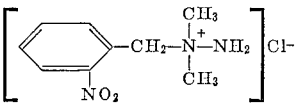

The procedure of Example 1 is followed using o-nitrobenzyl chloride in place of the o-bromobenzyl bromide, to give 1-(o-nitrobenzyl)-1,1-dimethylhydrazonium chloride.

*Example 5*

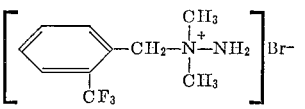

The procedure of Example 1 is followed using an equivalent amount of o-trifluoromethylbenzyl bromide (R. Filler and H. Novar, J. Org. Chem., 25, 733 (1960)) in place of the o-bromobenzyl bromide, to get 1-(o-trifluoromethylbenzyl)-1,1-dimethylhydrazonium bromide.

*Example 6*

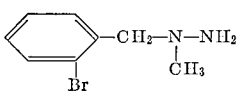

To a solution of 79.11 g. of methylhydrazine in 200 ml. of water is added, drop-wise, 85.85 g. of o-bromobenzyl bromide, over 30 minutes, while maintaining the temperature at 55–65° C. with stirring. After the addition is complete, the mixture is stirred at 65–70° C. for 3 hours. The reaction mixture is cooled and to it is added a solution of 15.1 g. of NaOH in 37.75 ml. of water. The viscous organic layer is separated and the aqueous layer is extracted twice with 50 ml. portions of chloroform. The combined extracts and organic layer are extracted three times with 50 ml. portions of 3 N hydrochloric acid solution. The combined hydrochloric acid aqueous extracts are extracted with 25 ml. of ether. The resulting clear aqueous solution is basified with excess 40% aqueous sodium hydroxide and the resulting organic layer is separated. The aqueous layer from this separation is twice extracted with 50 ml. portions of benzene followed by twice with 25 ml. portions of benzene. The combined organic layer and benzene extracts are dried over anhydrous sodium carbonate and the benzene is removed under reduced pressure. The residual oil is distilled to give a colorless liquid, B.P. 136–139° C. at 16 mm., $n_d^{25}$ 1.5747. Refractionation gives a purified sample of 1-(o-bromobenzyl)-1-methylhydrazine B.P. 139–140° C. at 16 mm. $n_d^{25}$ 1.5747, which analyzes correctly for $C_8H_{11}BrN_2$ (calculated: C, 44.67; H, 5.515; N, 13.02. Found: C, 44.38; H, 5.31; N, 12.97).

*Example 7*

Methyl bromide gas is passed through an isopropyl alcohol solution of 1-(o-bromobenzyl)-1-methylhydrazine. Ether is then added and the white solid is isolated by filtration. Recrystallization of this from t-butyl alcohol gives white prisms of 1-(o-bromobenzyl)-1,1-dimethylhydrazonium bromide, M.P. 139–140° C., identical to the product of Example 1.

*Example 8*

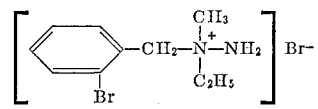

To 4.30 g. of 1-(o-bromobenzyl)-1-methylhydrazine is added with stirring 2.62 g. of ethyl bromide. The mixture is allowed to stand 84 hours under nitrogen at room temperature. A clear, glass like, hygroscopic product results. The product is thrice dissolved in dichloromethane and precipitated by the addition of petroleum ether. A white hygroscopic gum results which is dried in vacuo over $P_2O_5$. It analyzed correctly (calculated for $C_{10}H_{16}Br_2N_2$: C, 37.06; H, 4.98; N, 8.64. Found: C, 37.17; H, 5.10; N, 8.37) for 1-(o-bromobenzyl)-1-ethyl-1-methylhydrazonium bromide.

*Example 9*

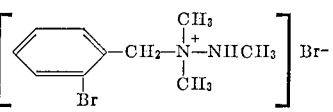

To a chilled sample of 5.04 g. of trimethylhydrazine (J. G. Aston and T. S. Oakwood, J. Am. Chem. Soc. 75, 2937 (1953)) there is added 17.0 g. of o-bromobenzyl bromide, drop-wise, with stirring. The reaction mixture is allowed to stand overnight at room temperature and it becomes very viscous. The mixture is then triturated with acetone and the 1-(o-bromobenzyl)-1,1,2-trimethylhydrazonium bromide is isolated by filtration. It is recrystallized from a mixture of tertiary butyl alcohol and anhydrous ether. M.P. 105.5–107.5° C.

*Analysis.*—Calculated for $C_{10}H_{16}Br_2N_2$: C, 37.06; H, 4.98; N, 8.64. Found: C, 37.19; H, 4.91; N, 8.66.

When o-chlorobenzyl chloride, o-methylbenzyl bromide or o-nitrobenzyl chloride is used in equivalent quantities in place of the o-bromobenzyl bromide, the correspondingly substituted hydrazonium salts are obtained.

*Example 10*

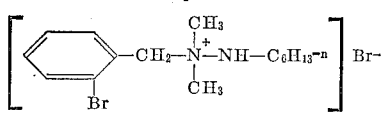

The intermediate, 1,1-dimethyl-2-hexylhydrazine is prepared as follows: To 60.1 g. of 1,1-dimethylhydrazine there is added drop-wise 120.2 g. of hexanal with stirring while maintaining the reaction temperature at 25–30° C. The reaction mixture is then heated at 94° for two hours. It is then cooled to room temperature and the organic layer is separated. The aqueous layer is extracted with ether and the ether extract is combined with the organic layer. The mixture is dried over sodium hydroxide. The ether is removed under reduced pressure and the product is distilled from calcium hydride through a distillation column to collect the liquid dimethylhexylidenehydrazine boiling at 67–72° C. at 14 mm. A second distillation gives material boiling at 73.5–74.5° C. at 16.5 mm. pressure $n_d^{25}$ 1.4463. Conversion to the methiodide gives a solid, melting at 83–86° C.

*Analysis.*—Found: C, 38.09; H, 7.20; N, 9.71. Calculated for $C_9H_{21}N_2I$: C, 38.04; H, 7.45; N, 9.86.

To a suspension of 4.59 g. of lithium aluminum hydride in 125 ml. of dry ether, there is added with stirring 57.8 g. of dimethylhexylidenehydrazine at a rate just fast enough to reflux the ether. The reaction mixture is then heated on a steam bath with stirring for about seven hours longer. The cooled reaction mixture is cautiously treated with ether saturated with water, and then with water. The resulting mixture is poured into finely crushed ice and acidified with dilute hydrochloric acid. The colorless ether layer is separated. The aqueous layer is concentrated under reduced pressure to a syrup which is chilled in an ice bath and then treated with concentrated aqueous sodium hydroxide solution until the oil is completely separated. The organic layer is separated and aqueous layer is extracted with ether. The ether extract is combined with the organic layer and the ether is removed under reduced pressure. The residual oil is dried over sodium hydroxide and distilled from sodium hydroxide, through a column, collecting the product boiling at 65–66° C. at 14 mm. $n_D^{25}$ 1.4253.

The 1,1-dimethyl-2-hexylhydrazine thus prepared (7.21 g.) is chilled in an ice bath and 13.75 g. of o-bromobenzyl bromide is added, dropwise, with stirring. The mixture is allowed to stand overnight at room temperature in a stoppered flask under nitrogen. The hydroscopic, waxy reaction mixture is ground in ether, filtered, and the reaction product, 1 - (o-bromobenzyl)-1,1 - dimethyl-2-hexyl-hydrazonium bromide, is washed with ether under nitrogen. M.P. 91–92° C.

*Analysis.*—Calculated for $C_{15}H_{26}Br_2N_2$: C, 45.70; H, 6.65; Br, 40.54; N, 7.12. Found: C, 45.21; H, 6.93; Br, 40.36; N, 7.20.

We claim:

1. Compounds of the formula

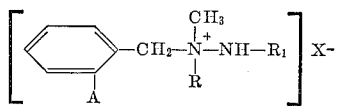

in which A is selected from the group consisting of halogen, lower alkyl, nitro and trifluoromethyl, R is selected from the group consisting of lower alkyl, $R_1$ is selected from the group consisting of hydrogen and lower alkyl and $X^-$ is an anion selected from the group consisting of sulfates, nitrates, alkanoates, alkylsufonates, benzylsulfonates and toluenesulfonates.

2. Compounds of the formula

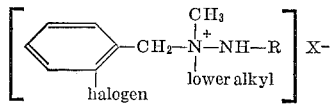

in which R is selected from the group consisting of hydrogen and lower alkyl and X is an anion of a pharmaceutically acceptable acid.

3. Compounds of the formula

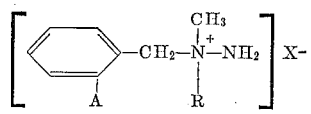

in which A is halogen, R is lower alkyl and $X^-$ is an anion.

4. Compounds of the formula

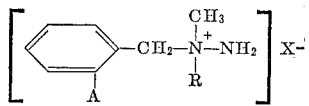

in which A is lower alkyl, R is lower alkyl and $X^-$ is an anion.

5. Compounds of the formula

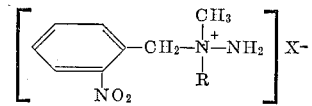

in which R is lower alkyl and $X^-$ is an anion.

6. Compounds of the formula

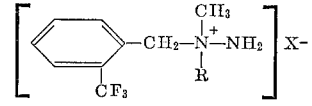

in which R is lower alkyl and $X^-$ is an anion.

7. Compounds of the formula

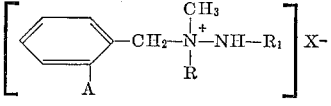

in which A is halogen, R and $R_1$ are each lower alkyl and $X^-$ is an anion.

8. Compounds of the formula

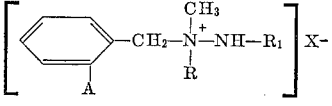

in which A, R and $R_1$ are each lower alkyl and $X^-$ is an anion.

9. Compounds of the formula

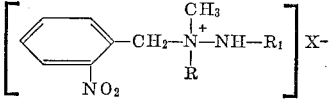

in which R and $R_1$ are each lower alkyl and $X^-$ is an anion.

10. Compounds of the formula

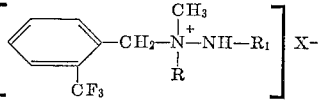

in which R and $R_1$ are each lower alkyl and $X^-$ is an anion.

11. Compounds of the formula

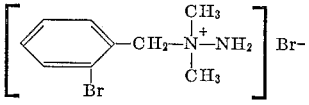

12. Compounds of the formula

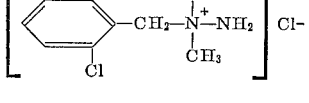

13. Compounds of the formula
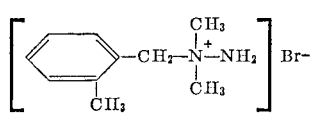
14. Compounds of the formula
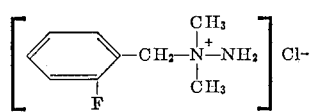
15. Compounds of the formula
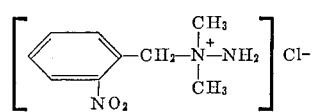
16. Compounds of the formula
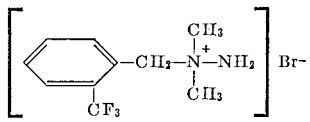
17. Compounds of the formula
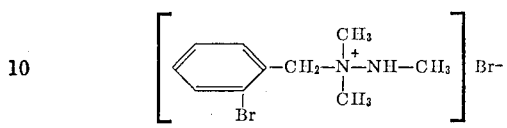
References Cited by the Examiner
UNITED STATES PATENTS
| | | | |
|---|---|---|---|
| 2,885,399 | 5/1959 | Omietanski | 260—569 |
| 2,909,567 | 10/1959 | Rudner | 260—569 |
| 3,000,903 | 9/1961 | Biel | 260—569 XR |
CHARLES B. PARKER, *Primary Examiner.*
LEON ZITVER, *Examiner.*
ROBERT V. HINES, *Assistant Examiner.*